Figure 1:
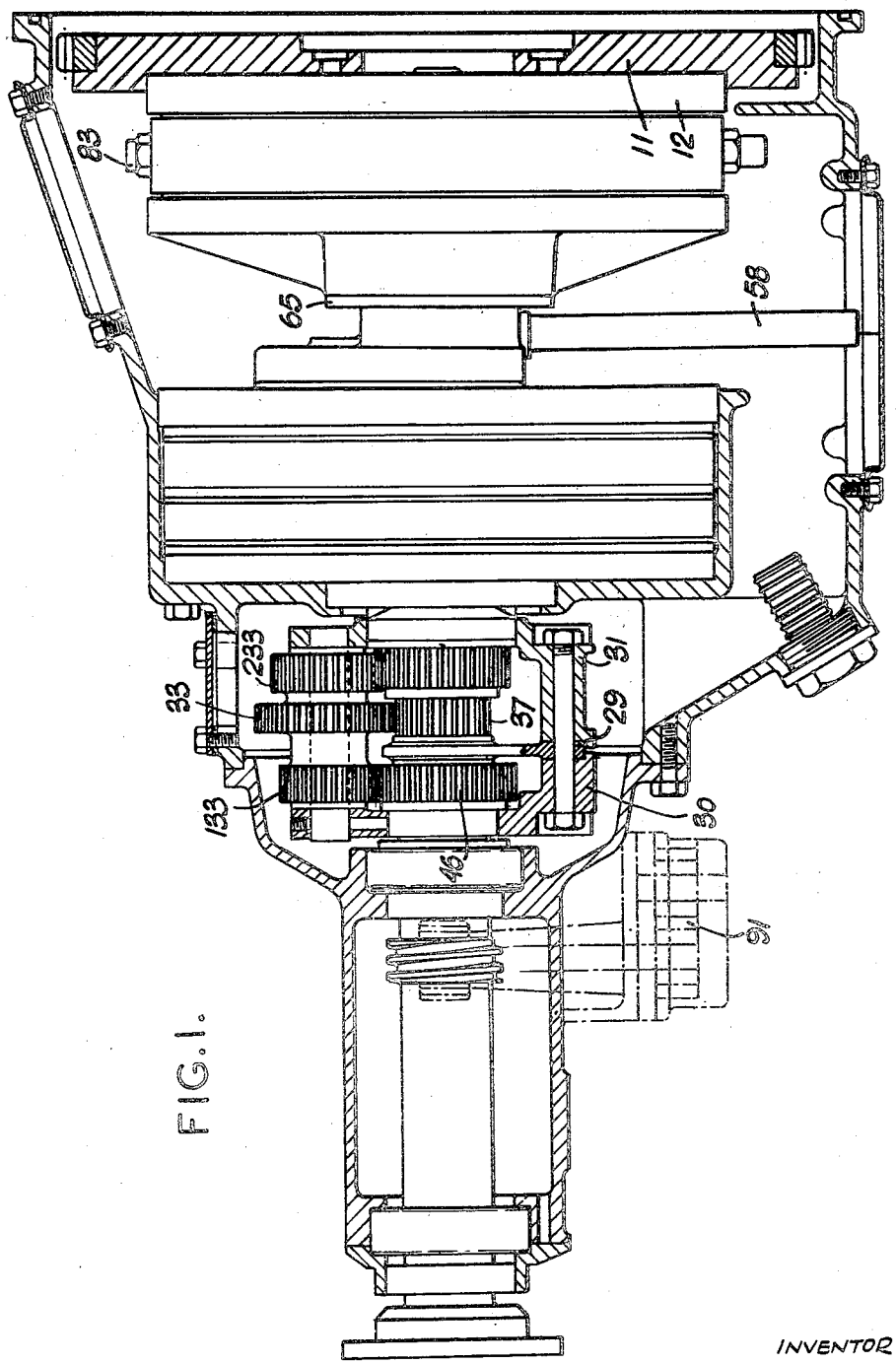

Oct. 16, 1951 H. F. HOBBS 2,571,448
VARIABLE RATIO POWER TRANSMISSION APPARATUS
Filed Feb. 7, 1949 5 Sheets-Sheet 4

INVENTOR
HOWARD FREDERICK HOBBS
BY
ATTORNEYS

Oct. 16, 1951     H. F. HOBBS     2,571,448
VARIABLE RATIO POWER TRANSMISSION APPARATUS
Filed Feb. 7, 1949                5 Sheets-Sheet 5
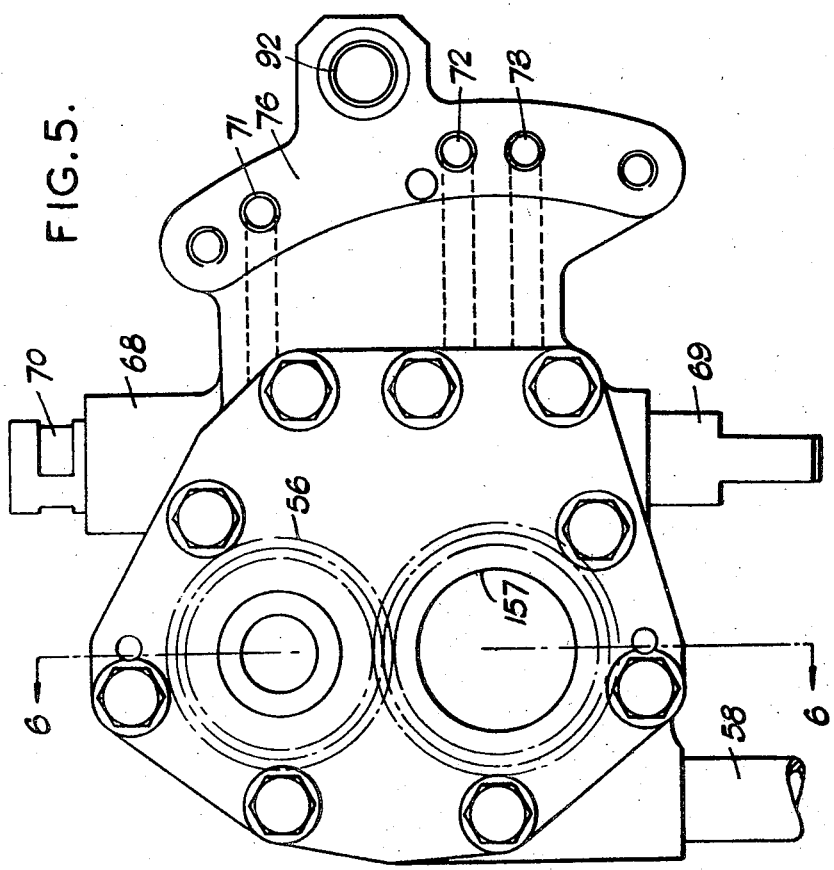
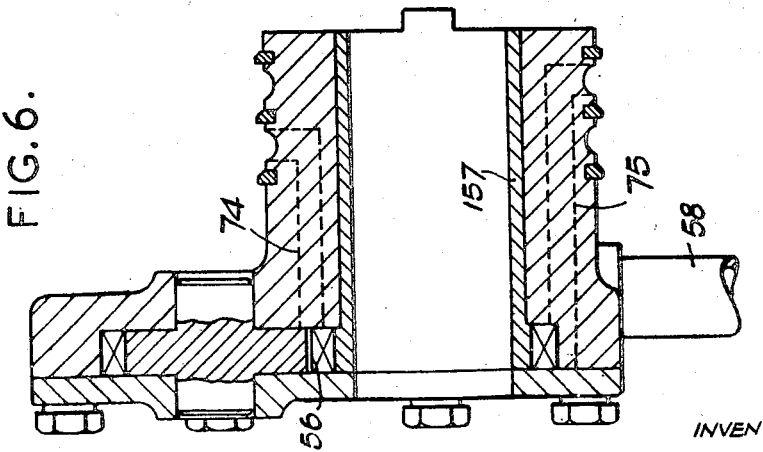
INVENTOR
HOWARD FREDERICK HOBBS
BY Young, Emery & Thompson
ATTORNEYS

Patented Oct. 16, 1951

2,571,448

UNITED STATES PATENT OFFICE 2,571,448

VARIABLE RATIO POWER TRANSMISSION APPARATUS

Howard Frederick Hobbs, Leamington Spa, England, assignor to Hobbs Transmission Limited, Leamington Spa, England, a British company Application February 7, 1949, Serial No. 74,902
In Great Britain February 11, 1948

2 Claims. (Cl. 74—763)

This invention relates to variable ratio power transmission apparatus of the kind having gearing associated with a number of friction devices whereby different ratios can be brought into operation by selective engagement of the friction devices.

Apparatus of this type is well known and usually takes the form of a series of epicyclic gear trains having friction devices acting as brakes which can hold one or another element of the gear trains stationary thereby producing a required transmission ratio between an input and output element. One or more clutches may also be employed to either transmit power from an input part or to lock various elements of the gear trains together.

The great advantage obtained from apparatus of this kind is that change in ratio can be effected in an easy and certain manner and less skill on the part of the operator is necessitated. In some cases technical advantage may be obtained in that the apparatus can be changed from one ratio to another without total interruption in the transmission of power.

Apparatus hitherto proposed has involved considerable complication, weight and bulk, as compared with the more commonly used transmission gearing. The arrangement of the gearing has been such that considerable limitation has been introduced concerning the actual power transmission ratios obtainable. The object of the present invention is to provide a simple and robust transmission whereby changes in ratio may be made under power without manual effort and in a certain and easy manner by an unskilled operator, the gear being such as to enable suitable ratios to be provided, the cost and weight of the apparatus being comparable with transmission gearing at present in common use.

According to the invention a variable speed power transmission apparatus comprises a gear train having at least three sun-wheels geared together through planetary pinions carried by a cage, one of said sun-wheels being mounted upon an output shaft, a number of friction engaging devices, some parts of said devices being carried by elements of the gear train, and other parts by an input part and a non-rotary housing, whereby said cage and at least one sun-wheel may be coupled to the input part, and at least two sun-wheels and a cage held against rotation so as to provide at least four forward and one reverse driving ratios between the input part and the output shaft.

The friction devices may each comprise a single plate carried by the elements of the gearing which are brought into engagement with co-acting friction surfaces carried by an input part or the non-rotary casing by means of hydraulic pressure. In the case of the input clutches part of the actuating pressure will be provided by centrifugal action. The friction surfaces of the clutches will preferably be lubricated to assist in providing the required smoothness of action and absence of wear.

The apparatus will be arranged so that in changing from one ratio to another one of the input friction devices will be disengaged and another engaged. When disengaged the liquid within the space serving as the actuating means will be exhausted.

Figure 2:
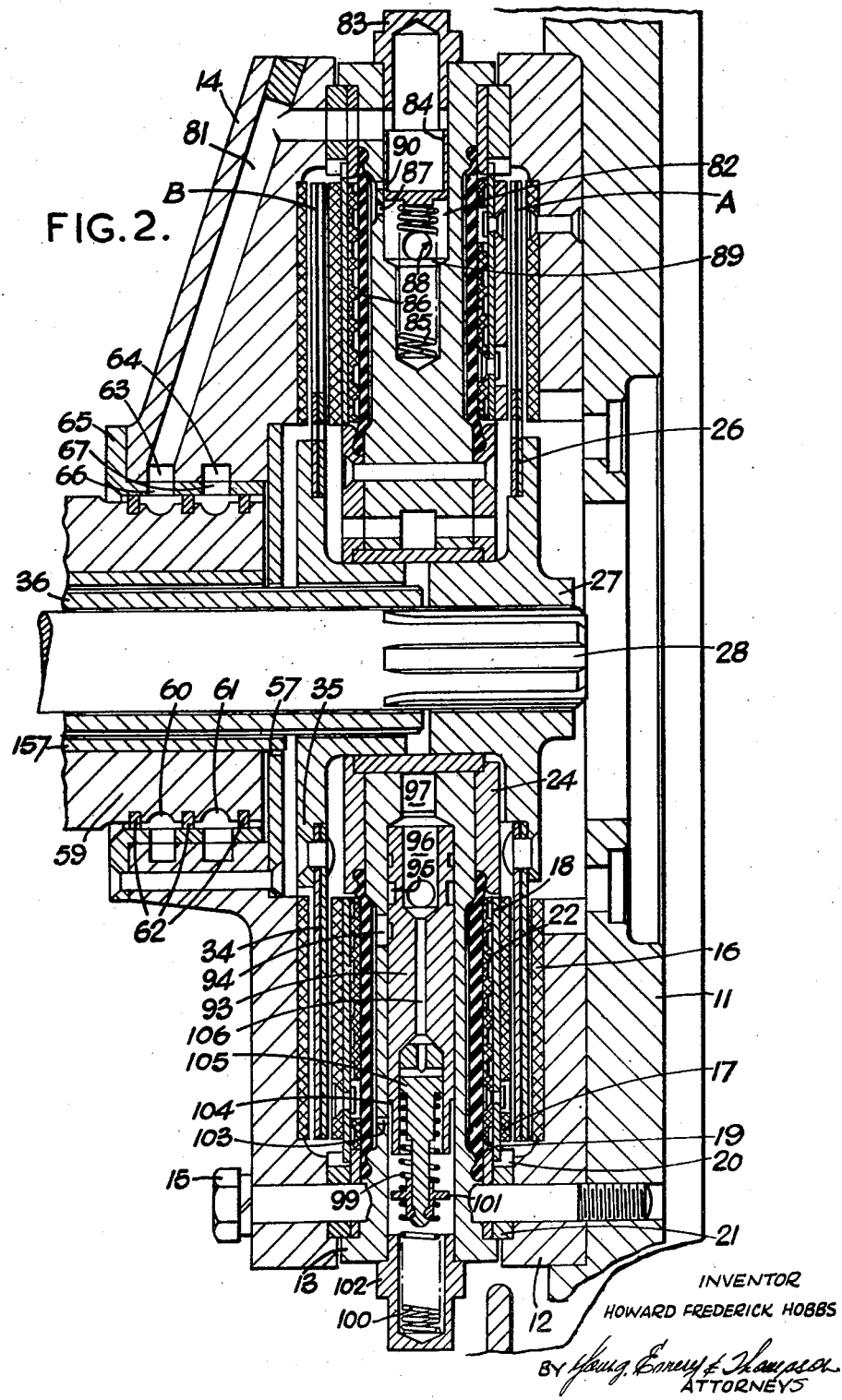
Figure 3:
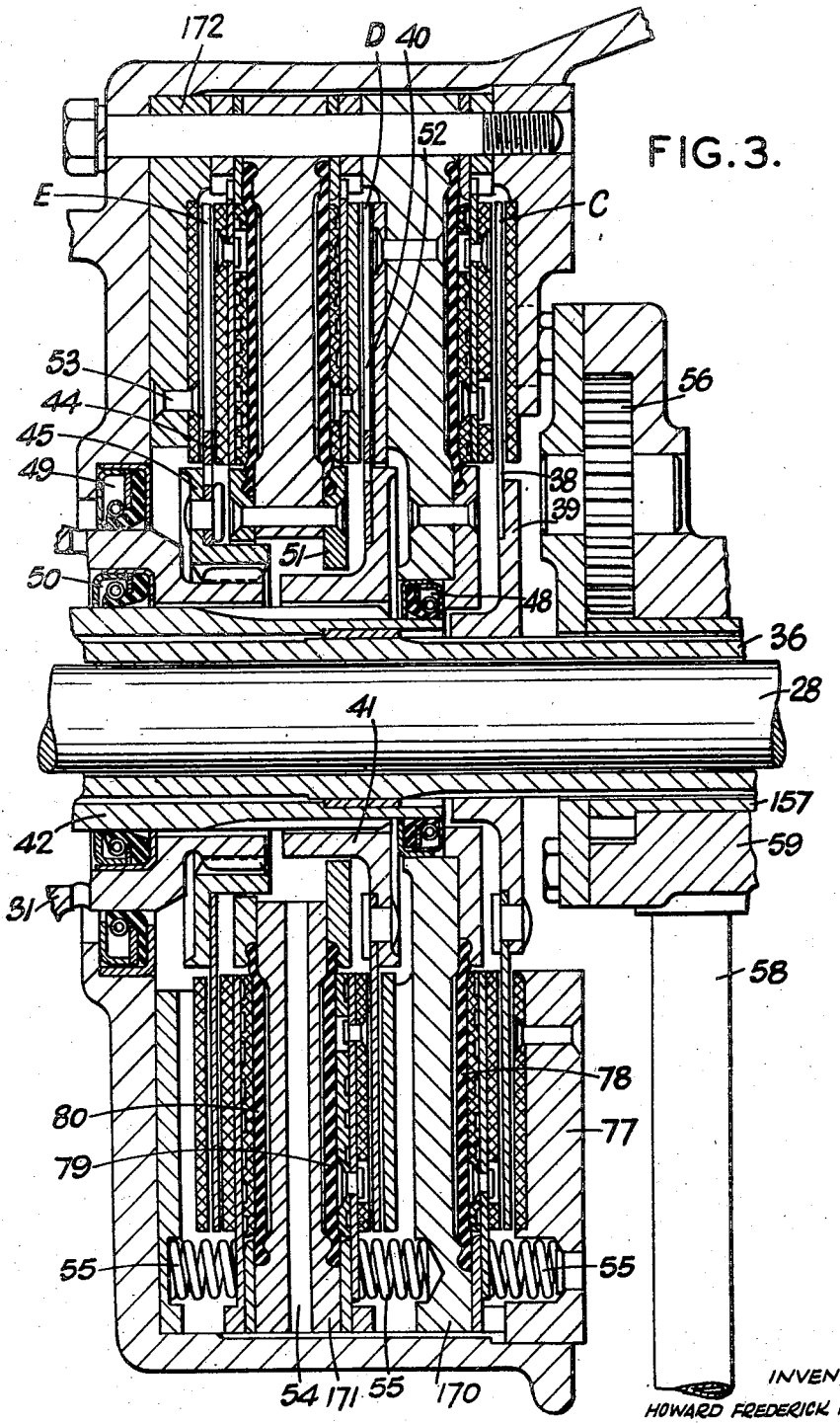
Figure 4:
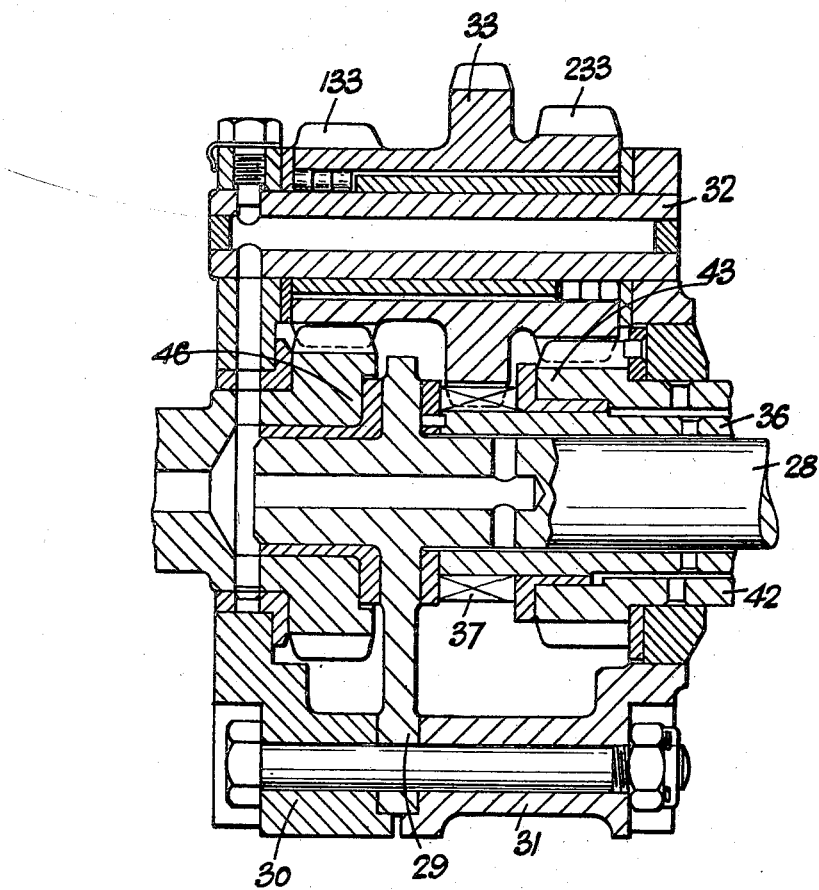

In order that the invention may be clearly understood and readily carried into effect it will be described by way of example with reference to the accompanying drawings in which:

Figure 1 is a vertical section of a transmission apparatus made in accordance with the invention;

Figures 2, 3, and 4, are similar views of parts of Figure 1 on an enlarged scale;

Figure 5 is an arrangement of the hydraulic pump and valve for directing the fluid pressure to the different clutches and brakes; and Figure 6 is a sectional view on the line 6—6 on Figure 5.

In Figure 1, five friction devices are shown, A, B, C, D, E. A and B are input clutches and C, D, E reaction brakes.

An input part forming the flywheel of an internal combustion engine is made up of an engine flywheel 11, a front plate 12, a plate 13 (hereinafter referred to as the valve body), and a rear plate 14. These plates are held together with bolts, not shown, to form a clutch unit. Bolts 15 bolt the parts 11, 12, 13, to the engine flywheel. A friction facing 16 is carried by the plate 12 and a friction facing 17 is riveted to a metal plate 18 which has teeth 19 formed thereon and which engage teeth 20 formed on a ring 21 which is clamped between the parts 12, 13. The plate 18 also carries an insulator plate 22 which separates the metal plate from a synthetic rubber faced diaphragm 23. The diaphragm 23 is clamped at its inner diameter by clamping ring 24 and at its outer diameter by a thin metal ring 25 which is located between the valve body 13 and the ring 21. The effective area of the diaphragm 23 is substantially the same as that of the friction surfaces, so that the engaging pressure acts over the entire surface through the relatively thin pressure plate 18. A spinner plate 26 consists of three plates, the outer plates being of steel and adapted to engage the friction facings 16, 17, the centre plate being slotted to form passages for the circulation of oil. Alternatively, a single plate may carry the friction facings. The relatively light metal parts of the clutches may be stamped from sheet. The clutch so far described is referred to generally as a clutch A.

A clutch B is similar in construction to the clutch A, comprising a spinner plate 34, two friction facings, a metal pressure plate, an insulator plate, and a synthetic rubber faced diaphragm.

The spinner plate 26 is carried by a hub 27, which is splined to an intermediate shaft 28. The shaft 28 forms part of a cage 29, at the rear end of the shaft. The cage carries side plates 30, 31, in which are mounted spindles 32 carrying a set of similar planetary pinions 33, 233. The pinions 33 are of the treble type each having three pinions 33, 133, 233, of different sizes. The spinner plate 34 of the clutch B is carried on a hub 35 which is splined to a second intermediate shaft in the form of a sleeve 36. The rear end of the sleeve 36 carries a sun-wheel 37. This meshes with the centre set of pinions 33.

Three brakes C, D, E, are provided of similar construction to that of the clutches except that the spinner plates are made from one single steel plate. The dimensions of the various parts of the clutches and brakes are identical so as to facilitate manufacture. The spinner plate 38 of the brake C is carried by a hub 39 and this is splined to the sleeve 36. The spinner plate 40 of the brake D is carried by the hub 41, splined to a third intermediate shaft or reaction sleeve 42, which carries a sun-wheel 43 in mesh with the pinions 233. The spinner plate 44 of the brake E is carried by a hub 45 and this is splined to the side plate 31 of the cage. A third sun-wheel 46 in mesh with the pinions 133 forms part of an output shaft 47. The non-rotary brake facings are carried by fixed plates 77, 170, 171, and 172.

Engagement of the clutch A will cause the cage 29 to be driven and the pinions 36 to planetate about the sun-wheels. Engagement of clutch B will cause the sun-wheel 43 to be driven causing the pinions 33 to rotate on their spindles 32. Engagement of brake C will cause sleeve 36 to be held stationary and also the sun-wheel 37. Engagement of brake D will hold the sun-wheel 43 stationary and engagement of brake E will hold the cage 29 stationary.

If the clutch A is engaged and the brake D, the cage 29 will cause the pinions 33 to planetate about the stationary sun-wheel 43. Since the sun-wheel 43 is somewhat smaller than the sun-wheel 46, this will cause the output shaft 47 to be driven in the same direction as the clutch A of the cage. The speed reduction between the shafts 28, 47 may be considerable since the sun-wheel 46 may not be much larger than the sun-wheel 42. This combination of clutch and brake will provide the first speed. If the clutch A and the brake D are disengaged and the clutch B and the brake E engaged, the cage 29 will be held stationary and the sun-wheel 37 will be driven at the same speed as the input part. The sun-wheel 46 and the output shaft 47 will be driven in the same direction as the sun-wheel 37, but at a reduced speed because of the relative sizes of the sun-wheels and the pinions. This combination of clutch and brake will provide the second speed forward. If the clutch B and the brake E are disengaged and the clutch A and brake C engaged, the cage 29 will be driven causing the pinions 33 to planetate about the small sun-wheel 37 which is held stationary by the brake C. This will provide 3rd speed and since the difference in size of the sun-wheels 37 and 46 is relatively great, a reduction in speed of the output shaft 47 will be relatively small. If the brake C is disengaged and the clutch B engaged, both clutches will be engaged and will cause the cage 29 and the sun-wheel 37 to rotate at the same speed. This will cause the whole of the gear to rotate without relative motion, and the sun-wheels 46, 47 to rotate at the same speed as the input part. This will provide 4th and direct ratio. If all the clutches and brakes are disengaged there will be no power transmitted and the apparatus will provide neutral. For reverse running the clutch B is engaged and also the brake D. The sun-wheel 37 will be driven in a forward direction. This will cause rotation of the pinion 33 and since the sun-wheel 43 is held stationary by the brake the pinions will planetate backwards, and owing to the fact that the sun-wheel 46 is larger than the sun-wheel 43, the output shaft 47 will rotate backwards at a relatively low speed. It will be observed, therefore, that the ratios are obtained as follows:

|  | Clutch Engaged | Brake Engaged |
|---|---|---|
| Reverse | B | D |
| Neutral |  |  |
| First | A | D |
| Second | B | E |
| Third | A | C |
| Fourth (Direct) | B and A |  |

The clutches are engaged alternately and the take-up during each change can be dependent upon the smoothness provided by the lubricated and centrifugally assisted clutches.

The reaction torque during drive in third ratio, and which is carried by the brake C, will be relatively low, and since the brake C is of the same dimensions as the brakes E, D, the friction surfaces are supplied with lubricant and this assists in making a smooth change from direct to third, although in this case, since it is a "down" change and some slight interruption in power transmission is required to enable the engine to increase its speed, the A clutch can be momentarily disengaged. The brakes E and D, and particularly D, carry greater torque than either the clutches A, B, or the brake C, and oil seals 48, 49 and 50 are provided to prevent lubricant from reaching the surfaces of these brakes. The hubs carrying the spinner plates and the clamping ring 51 of the brake D and facings 52, 53, of the brakes D and E respectively, are arranged to trap any quantity of oil which passes the seals and this can drain from the brake unit through holes such as 54.

The clutches and brakes are provided with push-off springs, those in the brake unit are shown 55, the pressure plates 18 having extensions between the toothed portions on which the springs operate.

It will be observed that the friction clutches are mounted adjacent to each other in the input member, and the brakes are mounted adjacent to each other in a fixed part, while a pump is disposed between the brakes and clutches for supplying the fluid pressure for operating the brakes and clutches and the planetary gearing is located between the brakes and the output member. As shown the rear end of the outer intermediate shaft carries the smallest sun-wheel and the output member carries the largest sun-wheel, the intermediate sized sun-wheel being carried at the rear end of the sleeve.

Liquid pressure for actuating the clutches and brakes is supplied by a gear pump 56, the driving gear of which engages the input part by means of projections 57, through a sleeve 157. The liquid is drawn by the pump through a suction pipe 58. The pump body, which will be hereinafter referred to as the hydraulic unit, carries a feed journal block 59 having grooves 60, 61 and oil seal rings 62. The back plate 14 has grooves 63, 64 which mate with the grooves 60, 61, but the sleeve 65 separates the grooves and has a number of holes 66, 67 to provide a path for the liquid.

The hydraulic unit is provided with a cylindrical bore 68 (Figure 4) to receive a control valve 69. This has a number of oilways 70 and the delivery from the pump is led through drillings to the bore 68. Drillings 71, 72, 73 lead from the bore to the brakes, and drillings 74, 75 (Figure 6) to the clutches. The valve 69 can be set in six different positions; reverse, neutral, first, second, third, and fourth. When in reverse position one of the oilways 70 will connect the pressure to the brake D and another oilway to the clutch B. The remainder of the clutches and brakes will be opened to exhaust by means of further oilways. For neutral position all the clutches and brakes will be open to the exhaust and in the other positions drillings leading to the suitable clutches and brakes as hereinbefore described will be open to pressure and the remainder to exhaust.

The plate 76 which carries the drillings 71, 72, 73 bolts to the front plate 77 (Figure 1) of the brake unit and each of the drillings leads to one of the actuating spaces 78, 79, 80 by means of tubes and further drillings in the parts of the brake unit. Two drillings, such as 81, lead from the grooves 63, 64, to cylindrical bores in the valve body 13, one of which is shown 82, the outer ends of which are closed by caps, such as 83. Valves such as 84 operate in the bores and are urged outwards by springs such as 85. When the valve 84 is in the position shown any liquid in a valve space 86 can escape through the exhausts 87, 88 and is expelled by centrifugal action into the casing. If liquid pressure from the pump 56 is opened by means of the valve 69 to the drilling 81 it will act on the outer end of the valve 84 causing it to move inwards until it abuts against the end of a bore 89. When in this position an inlet port 90 will be opened and liquid can flow through the drilling 81 into the space 86. The mass of the valve 84 and that of the spring 85 is suitably adjusted so that the centrifugal force thereon balances against centrifugal pressure acting on the valve by reason of the liquid in the drilling 81, and if the pressure from the pump is closed from the drilling 81, the spring 85 will cause the valve 84 to move outwards to the position shown where it abuts against the cap 83. The actuating space 86 may, therefore, be filled with liquid under pressure, or exhausted by means of the valve 69. The operation of the A clutch is similar. It is unnecessary to provide the brakes with valves of this kind since the liquid in the space is not subjected to centrifugal pressure and the springs 55 will be sufficient to cause the brakes to become disengaged should the valve 69 be positioned to open the spaces 78, 79, 80 to exhaust.

Should the input part be stationary the pump 56 will be inoperative and an additional pump 91 is driven by the output shaft 41 so that should, for example, it be found necessary to start an engine by towing a vehicle, suitable clutches and brakes can be engaged by means of liquid pressure delivered by this auxiliary pump. The pump 91 has a suction pipe leading to the sump and delivers pressure to a cored passage in the casing which mates with opening 92 in the plate carried by the hydraulic unit. This opening leads the liquid to the drillings which lead from the pump 56 to the valve 69.

It will be understood that the transmission is disengaged from the input part whenever the clutches A and B are disengaged by means of the valve 69, but to provide automatic engagement and disengagement at some predetermined speeds each of the clutches A, B is provided with a valve 93. These valves are arranged to uncover exhausts such as 94 thereby exhausting the pressure in the associated spaces through groove 95 and drillings 96, 97, 98. The main spring 99 and auxiliary spring 100 serve to urge the valve inwards in which position the groove 95 does not align with the port 94. The auxiliary spring is relatively light and over some predetermined range of idling speeds the centrifugal force on the valve 93 is sufficient to overcome the force from the spring and a collar 101 abuts against a valve cap 102. In this position the groove 95 aligns with the port 94 and any liquid delivered to the space by the pump can pass through the drillings into the interior of the clutch unit. The liquid circulates through the parts of the clutches. Increased speed of the input part will cause the centrifugal force on the valve 93 to overcome spring 99, thereby allowing the groove 95 to pass outwards beyond the drilling 94 thereby again closing the exhaust and causing automatic engagement of the clutch.

A drilling 103 serves to connect the space at the outer end of the valve 93 to the liquid actuating space.

When the valve moves outwards and a step 104 on the valve 93 passes beyond the drilling 103, the liquid at the outer end of the valve is trapped and must leak away between the plug 105 and the valve and through a drilling 106. The arrangement serves to damp the final closing movement of the valve and provide the desired smoothness of engagement. When the input part is stationary the auxiliary spring 100 causes the valve 93 to move to the position shown when the exhaust 94 is closed and the clutch may be engaged by means of the additional pump 91.

The particular arrangement of gearing and friction devices results in numerous advantages.

The apparatus can be built up with a number of separate standardized units which may comprise a clutch unit; a brake unit; a hydraulic unit, and a gear unit.

The friction devices can be placed at the front end of the apparatus where the necessary diameter can be conveniently accommodated, for example, when the unit is fitted to a motor vehicle.

Each of the friction devices is associated with considerable mass, for example, the clutches with the flywheel, and the brakes with the casing and engine. This tends to provide smoothness in take-up and ratio change.

The one clutch is disengaged and the other engaged to provide a change in ratio. Owing to the action of centrifugal force and a certain amount of inherent delay which occurs in filling and emptying the clutches, and which can be controlled by the relative sizes of the liquid ducts and arrangement of the valves 84, a smoothness in change from one to the other is obtained which cannot be provided by engagement and disengagement of stationary brakes alone.

Suitable ratios can be obtained without the introduction of excessive loads and/or speeds. It will be observed that when operating in first gear the pinions 33 planetate about the stationary sun-wheel 43. Since the sun-wheel 43 is about the same size as the engaging pinion the rotational speed of the pinions is about that of the input part. When operating in second gear since the sun-wheel 37 is smaller than the pinion 33 and the sun-wheel 45 larger than the engaging pinion, the speeds and loads are a minimum. When operating in third gear the pinions planetate about the stationary sun-wheel 37. Since this is relatively small and the pinion 33 large the speeds of the pinions are a minimum. When operating in fourth gear the gear train rotates in a solid condition, and there is no relative movement between the parts of the gear train. The necessary sizes of the gears to provide first and reverse ratios does not necessarily influence the ratios obtained in second and third, since second and third will largely depend on the sizes of the sun-wheel 37 and pinion 33. A minimum number of gears is employed to obtain four ratios forward and reverse.

I claim:

1. A variable-ratio power transmission apparatus comprising a stationary housing, an input member, inner and outer intermediate concentric shafts, a reaction sleeve surrounding said outer intermediate shaft, an output member, a clutch unit including a rotary clutch housing carried by said input member, two friction clutch members carried by said inner and outer intermediate shafts respectively, and means actuated by fluid pressure for selectively and simultaneously engaging said two friction members with said rotary clutch housing, three sun-wheels of different sizes carried on the sleeve, the outer intermediate shaft and the output member respectively, the sun-wheel on said reaction sleeve being on the end thereof which is remote from said friction clutch members, a gear train including a cage carried by said inner intermediate shaft and a set of treble planetary pinions rotatably carried on said cage, each of said treble pinions consisting of three pinions connected together and meshing permanently with said three sun-wheels respectively, a brake unit including a brake housing carried by said stationary housing, three friction brake members carried by said outer intermediate shaft, said reaction sleeve and said cage respectively, and means actuated by fluid pressure for selectively braking said three friction brake members with said brake housing, and means for separately and simultaneously supplying fluid under pressure to said means for operating said friction clutches and friction brakes so as to provide at least four forward and one reverse driving ratios between the input and the output members.

2. A variable-ratio power transmission apparatus comprising a stationary housing, input and output members, inner and outer intermediate shafts, a reaction sleeve surrounding a portion of said outer intermediate shaft, a clutch unit including a rotary clutch housing carried by said input element, two friction clutch members carried by said inner and outer intermediate shafts respectively at one end thereof, and means actuated by fluid pressure for selectively and simultaneously engaging said two friction members with said rotary clutch housing, three sun-wheels of different sizes carried on one end of said reaction sleeve, said output member and the other end of said outer intermediate shaft respectively, the sun-wheel on said reaction sleeve being on the end thereof which is remote from said friction clutch members, a gear train including a cage carried by said inner intermediate shaft at the other end thereof and a set of treble planetary pinions carried on said cage, each of said treble pinions consisting of three pinions connected together and meshing permanently with said three sun-wheels respectively, a brake unit located intermediate said clutch unit and said gear train, said brake unit including a brake housing carried by said stationary housing, three friction brake members carried by said outer intermediate shaft, the other end of said reaction sleeve, and said cage respectively, the friction brake member on the reaction sleeve being disposed between the other friction brake members and means actuated by fluid under pressure for selectively braking said three friction brake members with said brake housing, and a hydraulic unit disposed between said brake and clutch units, said hydraulic unit consisting of a pump located adjacent said brake unit and driven by the rotary clutch housing, means communicating between said pump and the means for actuating the friction clutch and brake members, and valve means for controlling the flow of fluid under pressure in said communicating means so as to separately and simultaneously operate said friction brake and clutch members thereby providing at least four forward and one reverse drive ratios between the intput and output members.

HOWARD FREDERICK HOBBS.

REFERENCES CITED

The following references are of record in the file of this patent:

UNITED STATES PATENTS

| Number | Name | Date |
|---|---|---|
| 2,150,950 | Thoma | Mar. 21, 1939 |
| 2,220,174 | Ravigneaux | Nov. 5, 1940 |
| 2,374,303 | Osborne | Apr. 24, 1945 |
| 2,381,593 | Hobbs | Aug. 7, 1945 |
| 2,395,459 | Carnagua | Feb. 26, 1946 |

FOREIGN PATENTS

| Number | Country | Date |
|---|---|---|
| 15,279 | Great Britain | July 9, 1902 |